Sept. 18, 1928.

D. H. SCHWEYER

AIR BRAKE APPARATUS

Filed April 2, 1925

1,684,559

Inventor:
D. H. SCHWEYER,
By Monroe C. Miller
Attorney.

Patented Sept. 18, 1928.

1,684,559

UNITED STATES PATENT OFFICE.

DANIEL HERBERT SCHWEYER, OF EASTON, PENNSYLVANIA.

AIR-BRAKE APPARATUS.

Application filed April 2, 1925. Serial No. 20,103. REISSUED

The present invention relates to automatic train control, and more particularly the air brake system of a train, especially that of a freight train, it being the primary object of the invention to automatically control the brakes of the locomotive and cars, under caution or service brake application conditions, in a way to simulate the control of the locomotive and car brakes as obtained by the engineer under manual control for service conditions.

In other words, the present apparatus is intended to function automatically, under caution or service brake application conditions, to control the brakes of the locomotive and cars as nearly as possible to the manner in which the brakes are controlled by the engineer, in order that the movement of the train may be retarded without the liability of the train buckling or breaking apart. It is well known in the art that when the brake pipe or train line is opened to the atmosphere by opening the engineer's brake valve in the engine or locomotive, the reduction in pressure in the brake pipe starts first at the forward end of the train and works rearwardly, so that the brakes of the locomotive and first cars are applied first, and the brakes of the other cars are applied in succession rearwardly. This results in the locomotive and front cars being retarded while the rear cars have their brakes released, and the momentum of the rear cars, especially with a long or heavy fast train, is frequently sufficient to buckle the train between its ends. In order to overcome such buckling of a long or heavy train, the engineer will control the brakes of the locomotive and cars separately, whereby a partial reduction in the brake pipe of the cars is made to partially apply the car brakes, while the brakes of the locomotive, or engine and tender, are released. In this way, the locomotive continuing its momentum has a tendency to pull the front cars and thereby take the slack out of the train, while the brakes of the cars in rear are being applied gradually. The brakes of the locomotive are then applied partially to retard the locomotive as the brakes of the rear cars are applied. Such control of the locomotive and car brakes is obtained by the engineer by the control of the main brake valve and an auxiliary brake valve controlling the brakes of the locomotive, and such control of the locomotive and car brakes is highly desirable in an automatic train control apparatus in order that long or heavy freight trains can be retarded without the liability of the trains being buckled or broken.

The present apparatus, which is connected to the air brake equipment of the train, performs a number of functions, as follows: When travelling above a predetermined (maximum caution or service) speed, and a control valve or member is moved to caution or service brake application position, the brakes of the cars are applied by bleeding the air from the brake pipe to the atmosphere, while the brakes of the locomotive (engine and tender) are released, so that the momentum of the locomotive has a tendency to keep the front cars moving, or to keep the slack, partially at least, out of the train, thus preventing the cars from bunching too quickly. While the air is discharging from the brake pipe of the cars, air is supplied from the main reservoir to the locomotive brake pipe so as to release the locomotive brakes. Also, at the same time, the steam or other power of the locomotive is shut off, in order to prevent too great a strain on the coupler between the locomotive and first car should the power remain applied when the brakes of the first cars are applied. When the speed of the train has been reduced below the aforesaid predetermined amount the reduction in pressure in the brake pipe of the cars stops and, when such speed reduction has been made then air from the main reservoir is cut off from the locomotive brake pipe, and the locomotive brake pipe is opened to the atmosphere to then apply the locomotive brakes until a given reduction in pressure has been made. This will now retard the locomotive so as to bunch the cars together. After a short interval of time following the application of the locomotive brakes, air is then supplied from the main reservoir into the brake pipe of the cars so as to release the car brakes, and when a predetermined reduction in pressure in the locomotive brake pipe has been made then the discharge of air from the locomotive brake pipe is stopped. Then, when the brake pipe of the cars is charged up to or near normal pressure, so as to release the car brakes, the locomotive brake pipe is then charged so as to release the locomotive brakes following the release of the car brakes. The train can then proceed under the maximum caution or service speed, the discharge of air from the brake pipe being shut off by a speed controlled or governor valve.

The arrangement is such that when a caution or service brake application is established, with the train already travelling below the maximum caution speed, then no application of the brakes of either the locomotive or cars is made, but will be made if such speed is exceeded. Also, the apparatus does not in any way interfere with the full application of the locomotive and car brakes when an emergency brake application is made, either manually by the engineer's brake valve, or automatically by the control valve of the apparatus.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawing, wherein the figure is a diagrammatical view of the apparatus, portions being shown in section and portions in elevation.

Figure 1:
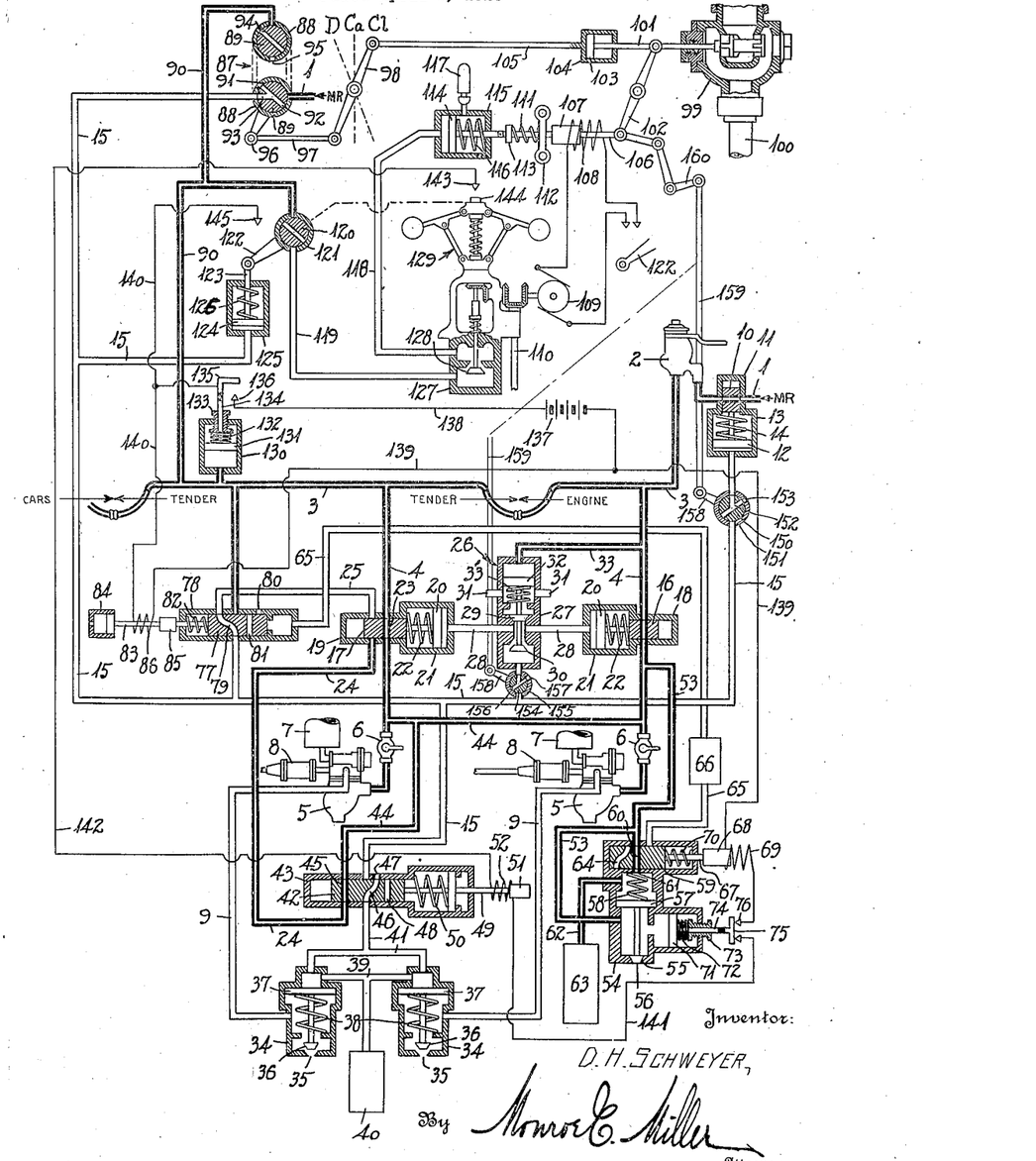

The several parts and devices are illustrated in normal clear or running position, and the pipes indicated by heavy lines are normally under brake pipe pressure, whereas the pipes indicated by light lines are normally under low or atmospheric pressure.

The pipe 1 leads from the main reservoir (not shown) from which air is supplied into the brake pipe 3 through the engineer's brake valve 2 as usual, and branches 4 extend from the brake pipe 3 on the engine and tender, to the triple valves 5 of the engine and tender, said branch pipes 4 having the manual cut out valves 6. The triple valves 5, like the triple valves of the cars, as well known, operate automatically to normally supply the air from the brake pipe into the auxiliary reservoirs 7, with the brakes released, and to open the brake cylinders 8 to the atmosphere to release the brakes, whereas when the pressure in the brake pipe is reduced the triple valves shut off communication between the brake cylinders 8 and the atmosphere and connect said brake cylinders and reservoirs 7 so that air flows from the reservoirs into the cylinders to apply the brakes. As shown, discharge pipes 9 lead from the triple valves 5 of the locomotive for the discharge of air from the cylinders 8, to release the brakes, when the pressure in the brake pipe is increased.

The parts 1 to 9, inclusive, belong to the ordinary air brake system, the construction and operation of which are well known in the art.

The present apparatus has a shut-off valve 10 between the main reservoir and engineer's brake valve 2, for shutting off the air from the main reservoir to the brake valve, under caution conditions, while the train exceeds a predetermined maximum danger speed, to prevent the engineer from releasing the brakes under such conditions. The valve 10 slides in a casing 11 disposed in the pipe 1, and said valve is connected to a piston 12 working in a cylinder 13 united with said valve casing. A spring 14 bears against the piston 12 to open the valve 10 under normal conditions, and a pipe 15 is connected to the cylinder 13 for supplying air from the main reservoir into the cylinder 13 against the piston 12 to close the valve 10 when air is free to follow from said pipe into said cylinder, the air pressure from the pipe 15 overcoming the spring 14. A valve 150 controls the flow of air from the pipe 15 into the cylinder 13 and turns in a valve casing 151 disposed in said pipe, said valve having a passage 152 normally connecting the cylinder 13 and the discharge port 153 of said casing which opens the cylinder to the atmosphere so that the air escapes and the spring 14 moves the valve 10 to open position. When the valve 150 is turned, by speed control means as hereinafter described, the passage 152 establishes communication through the pipe 15 with the cylinder 13 and air flowing from said pipe into the cylinder will raise the piston 12 and close the valve 10.

Valve devices are provided for shutting off or closing communication between the brake pipe 3 and the triple valves 5 under caution conditions, including the valves 16 and 17 slidable in the valve casings 18 and 19, respectively, and connected to pistons 20 working in cylinders 21 connected to said valve casings. Springs 22 normally move the pistons 20 and valves so that communication is had through said valves between the brake pipe 3 and triple valves through the branch pipes 4 in which the casings 18 and 19 are disposed. The valve 17 has a port 23 normally registering with the corresponding pipe 4, and which registers with pipes 24 and 25 connected to the casing 19 when the valve 17 is moved against the pressure of the corresponding spring 22.

A valve device 26 controlled by brake pipe pressure is provided to control the flow of air into and out of the cylinders 21, and includes a casing 27 connected by pipes 28 with the cylinders 21, and a branch of the pipe 15 is connected to the casing 27. Alternately seating valves 29 and 30 are movable in the casing 27 with a piston 32, and the casing 27 has discharge ports 31 opening into the atmosphere. The ports 31 are located between the piston 32 an valve 29, and the valve 30 is located between the pipes 15 and 28. A branch pipe 33 extends from one of the pipes 4 and is connected to the casing 27 so that brake pipe pressure normally moves the piston 32 to close the valve 29 against the influence of a spring 33' which bears against the piston 32 in an effort to open the valve 29 and close the valve 30. When an emergency application of the brakes is made so as to greatly reduce the pressure in the brake pipe 3, the piston 32 is raised by the spring 33', thereby opening the valve 29 and closing the valve 30, for purposes which will hereinafter more fully appear. With the valve 29 normally seated and the valve 30 normally unseated, when air under pressure is supplied into the pipe 15 and the air is free to flow into the casing 27 it flows past the valve 30 through the pipes 28 into the cylinders 21 to move the pistons 20 against the springs 22, thereby moving the valves 16 and 17 to close the pipes 4, and the port 23 will now establish communication between the pipes 24 and 25. A valve 154 controls the flow of air from the pipe 15 into the casing 27, and turns in a valve casing 155 disposed in the corresponding branch of said pipe, said valve having a passage 156 normally connecting the casing 27 and the discharge port 157 of said casing which opens the casing to the atmosphere, so that the air escapes and the springs 22 move the valves 16 and 17 to normal position. When the valve 154 is turned, by speed control means as hereinafter described, the passage 156 establishes communication through the pipe 15 with the casing 27 and air flowing from said pipe into the cylinders 21 will slide the valves 16 and 17 to close the pipes 4.

The discharge of air from the triple valves 5 through the pipes 9 is prevented, when a limited reduction in locomotive brake pipe pressure is made, and, for this purpose, valve devices are provided including the casings 34 to which the pipes 9 are connected and which have the discharge ports 35 to be closed by the valves 36 movable with pistons 37 that move in the casings. Springs 38 normally raise the pistons 37 to open the valves 36 whereby the pipes 9 communicate through the ports 35 with the atmosphere. A pipe 39 connects the casings 34 at that side of the pistons 37 opposite to the ports 35, and a reservoir 40 is connected to the pipe 39. A pipe 41 is similarly connected to the casings 34 for the flow of air into and out of the casings 34 to close and open the valves 36.

A valve device is provided, controlled, under caution conditions, by the speed of the train and the air pressure in the locomotive brake pipe, for controlling the flow of air into and out of the casings 34 through the pipe 41, and for also simultaneously controlling the charging of the locomotive brake pipe 44 which connects and bridges the pipes 4 between the triple valves and the shut off valves 16 and 17. Such valve device includes a slide valve 42 movable in the valve casing 43 to which the pipes 15, 24, 41 and 44 are secured. The valve 42 has a port 45 normally establishing communication between the pipes 24 and 44, and has a port 46 normally establishing communication between the pipe 41 and a port 47 opening into the atmosphere so that air is normally discharged from the casings 34 through the pipe 41 and ports 46 and 47, whereby the springs 38 raise the pistons 37 and open the valves 36. The valve 42 has a port 48 which establishes communication between the pipes 15 and 41 when the valve is moved to its other position, in which event the port 47 and pipes 24 and 44 are closed. The valve 42 has a stem 49, and a spring 50 normally moves the valve 42 to the position as shown. A core 51 is carried by the stem 49 to be attracted into a solenoid 52, when said solenoid is energized, to move the valve 42 to its other position against the force of the spring 50.

A differential or equalizing valve device is provided to provide for a predetermined reduction in pressure in the locomotive brake pipe 44, and includes a casing 54 to which is connected a branch 53 of the locomotive brake pipe 44. The casing 54 has a discharge port 55 opening into the atmosphere and normally closed by a valve 56 movable with a piston 57 slidable in the casing, said piston being an equalizing or differential piston subjected to air pressure on opposite sides. A spring 58 bears on the piston 57 to move the piston in a direction to close the valve 56, and the pipe 53 opens into the chamber between the piston 57 and the valve 56. A valve 59 is slidable in the casing 54 and has a port 60 normally establishing communication between the pipe 53 and a port 61 opening into the chamber of the casing 54 at that side of the piston 57 opposite to the port 55, so that the piston 57 is normally subjected to brake pipe pressure from above and below, so that the spring 58 closes the valve 56. A pipe 62 is connected with the casing 54 in communication with said chamber above the piston 57 and has a reservoir 63 connected thereto, so that said reservoir receives air from the brake pipe. The valve 59 has a second port 64 to connect the port 61 with a pipe 65 when the valve is slid to its other position, with communication between the port 61 and the pipe 53 closed. The pipe 65 has a reservoir 66 therein to receive air from the reservoir 63 when the port 64 connects the pipe 65 with the port 61 and pipe 62. The valve 59 has a stem 67 on which a core 68 is mounted to be drawn or attracted into a solenoid 69 when said solenoid is energized, to slide the valve 59 from its normal position, and a spring 70 moves the valve 59 to its normal position when the solenoid is deenergized.

The circuit of the solenoids 52 and 69 is controlled by locomotive brake pipe pressure. Thus, a piston 71 is slidable in the casing 54 and is subject to pressure of air from between the piston 57 and valve 56, a coiled spring 72 being confined between the piston 71 and an adjusting screw 73 by means of which the pressure of the spring is regulated. The screw 73 is tubular and the stem 74 of the piston 71 extends through said tube and carries an insulated switch 75 to bridge the contacts 76 of the circuit. The screw 73, for the purposes of the present invention, is adjusted so that when there is a reduction of fifteen pounds in the pressure of air in the locomotive brake pipe, the spring 72 moves the piston 71 to open the switch 75, although the screw 73 can be adjusted to open said switch under different pressures.

A retarded valve device is provided for the flow of air from the main reservoir into the locomotive brake pipe or into the main brake pipe or train line, alternately. This valve device includes a valve 77 slidable in a valve casing 78, and having a port 79 normally establishing communication between the pipe 15 and the pipe 25. The pipe 15 is connected to one end of the casing 78 and the valve 77 provides a piston to be moved by air entering the casing or cylinder 78 through the pipe 65. When the valve is slid by air flowing through the pipe 65, said valve closes the pipe 25, and a port 81 in the valve 77 will then establish communication between the pipes 3 and 15 which have branches connected to said casing 78. Also, when the valve is slid by air flowing through the pipe 65, the port 80 is uncovered to enable air from the pipe 65 to flow into the atmosphere. The valve 77 is moved to normal position by a spring 82, and a dash pot 84 or other retarding means is provided to retard or slow down the movement of the valve 77 so that it will require approximately thirty seconds, or thereabout, for the valve 77 to move from its normal position to a position to uncover the port 80 and bring the port 81 into communication with the pipes 3 and 15. The valve 77 has a stem 83 connected to the dash pot 84 and carrying a core 85 to be moved into attractive relation with a solenoid 86 when the valve 77 is moved by air pressure, said core 85 being normally sufficiently removed from the solenoid 86 so as not to be attracted into said solenoid even though the solenoid is energized, unless the valve is moved by air pressure to bring the core into the effective field of the solenoid. The solenoid 86 and core 85 therefore provide a holding means to retain the valve 77 in abnormal position, after being moved to such position by air pressure, until the circuit of the solenoid 86 is broken, in which event the spring 82 will return the valve 77 to normal position.

The apparatus is controlled for clear or running, caution or service and danger or emergency conditions by means of a control valve 87, which is a duplex valve, including a valve member 89 rotatable within a casing 88. A branch pipe 90 of the brake pipe 3 is connected to the casing 88, and the main reservoir pipe 1 and pipe 15 are also connected to said casing. The casing 88 has ports 91 and 95 opening into the atmosphere, and the valve member 89 has a passage 92 and branch passage 93 thereof, and also has a passage 94. The valve member 89 has an arm or lever 96 for turning it to the three different positions, and said arm 96 is connected by a link 97 with a main control lever 98 that is operated automatically in any suitable manner, by control from the track or otherwise, the particular control mechanism forming no part of the present invention and not being shown or described. So far as the present apparatus is concerned the lever 98 and valve 97 may be operated manually as well as automatically. In the normal or clear position of the valve 87 the passage 92 registers with the port 91 and the passage 93 registers with the pipe 15, so that air flows from the pipe 15 to the atmosphere, with the pipes 1 and 90 closed. In the second or caution position of the valve 87 the passage 92 registers with the pipes 1 and 15, so that air flows from the main reservoir into the pipe 15. In the third or danger position of the valve 87, the pipe 15 is closed and the passage 94 registers with the pipe 90 and port 95 so that the air can bleed through the atmosphere from the brake pipe 3 thereby providing an emergency or danger application of the brakes.

In order to cut off the power which drives the locomotive, a power cut off device 99 is provided which, as shown, is a balanced valve controlling the flow of steam through the pipe 100, although an electric switch can be provided for use with electric power. The device 99 has a stem 101 connected to a lever 102, and has a collar 103 moving within a yoke 104 of a rod 105 connected to the control lever 98, thus providing for lost motion or loose play between the stem 101 and rod 105. Thus, when the lever 102 is swung the device 99 can be operated to shut off the power, and when the lever 98 is moved from clear to caution position, sufficient play is then provided to permit the stem 101 to be subsequently moved to shut off the power without moving the rod 105 further, which, if it occurs, would move the lever 98 to danger or emergency position. Furthermore, the lever 98 can move from clear to caution position without moving the stem 101 to cut off the power, but when the lever 98 is moved to danger position then the yoke 104 moves the collar 103 and stem 101 to shut off the power.

The lever 102 is operated by a rod 106 carrying a core 107 to be attracted into a solenoid 108 connected in circuit with an electric generator 109 that is driven according to the speed of the train, through suitable gearing 110 connected to an axle or other movable part that rotates in accordance with the motion of the train. The electro-magnetic device 107—108 controlling the power cut off device 99 is therefore speed controlled, and the adjustment is such that the solenoid 108 is only energized sufficiently to attract the core 107 when the speed of the train is above a predetermined maximum caution limit, of say twenty or thirty miles per hour. Below such speed the current generated by the generator 109 is not sufficient to energize the solenoid 108 sufficiently to attract or hold the core 107. The rod 106 is returned by a spring 111 confined between a frame member 112 and a nut or collar 113 adjustably screw-threaded on the rod, said nut or collar 113 being adjustable in order to regulate the pressure of the spring 111 and thereby control the release of the core 107 from the solenoid 108 at different train speeds. The rod 106 has a piston 114 movable in a cylinder 115 and a spring 116 bearing against the piston 114 assists the spring 111 in moving the rod 106 to normal position as shown. A whistle or other audible signal 117 is connected to the cylinder 115 for the discharge of air through the whistle to give an audible alarm, under caution conditions, when the brakes are being applied. Pipes 118 and 119 are disposed between the cylinder 115 and the pipe 90, the pipe 119 being connected to the cylinder 115, and a valve 120 is disposed between the pipes 90 and 119, being rotatable within the casing 121 to which said pipes are connected. The valve 120 has an arm 122 connected to the stem 123 of a piston 124 that moves in a cylinder 125 to which a branch of the pipe 15 is connected, so that when air is delivered into the pipe 15 the piston 124 is moved against the pressure of the spring 126 to open the valve 120 and connect the pipes 90 and 119. The valve 120 is normally closed by the movement of the piston 124 under the pressure of the spring 126. The valve 120 opens the brake pipe 3, by way of the branch pipe 90, for the discharge of air from the brake pipe to reduce the pressure in said brake pipe, and beyond the valve 120 there is a speed controlled or governor valve 128 that also controls the flow of air from the brake pipe, said valve 128 being disposed in a casing 127 to which the pipes 118 and 119 are connected, and said valve 128 is operably connected with a centrifugal governor 129 operated by the gearing 110 so as to be rotated in accordance with the speed of the train. The valve 128 is closed below a predetermined speed of say twenty or thirty miles per hour, and is opened above such speed.

A brake pipe pressure device is provided for controlling the circuits of the solenoids 52, 69 and 86, and includes a cylinder 130 connected to the brake pipe 3 having a piston 131 movable therein, the brake pipe pressure normally moving said piston against the pressure of a spring 132 which is confined between said piston and an adjusting screw 133 screw-threaded in the cylinder. The screw 133 is tubular and the stem 134 of the piston projects through said screw and carries an insulated switch 135 that is normally removed from a contact 136. The screw 133 is adjusted so that a predetermined reduction in brake pipe pressure will close the switch 135 against the contact 136. For example, as hereinafter described, a reduction of three pounds in the pressure of air in the brake pipe 3 will enable the spring 132 to move the piston 131 against brake pipe pressure to close the switch 135, thereby closing two electrical circuits.

When the switch 135 is closed, this closes the circuit of the solenoid 86, such circuit including the battery 137 or other source of electrical energy, conductor 138, contact 136, switch 135, conductor 140, solenoid 86 and conductor 139. The solenoid 86 is therefore energized whenever the reduction in pressure in the brake pipe 33 is three pounds or more.

Under caution conditions, with the arm 122 moved to open the valve 120, the circuit of the solenoids 52 and 69 is also completed, and said circuit includes the battery 137, conductor 138, contact 136, switch 135, conductor 140, contact 145, arm 122 in raised position, ground connection through the metal parts of the casing 121, pipe 119 and governor 129, contacts 143 and 144, conductor 142, solenoid 52, conductor 141, switch 75 and contacts 76, solenoid 69 and conductor 139. The contacts 143 and 144 are separated when the train is travelling above a predetermined speed, and said contacts engage one another when the speed is reduced, such as when the valve 128 is closed.

The valves 150 and 154 are connected to the speed control device in any suitable manner so that under caution conditions said valves are only in closed position to shut off the flow of air from the pipe 15 into the cylinder 13 and casing 27 when the train is travelling below the maximum caution speed. Thus, the valves 150 and 154 have arms 158 connected by the rods 159 with the rod 106 through a lever 160, so that the springs 111 and 116 not only move the rod 106 to normal position to open the valve or device 99, but also turn the valves 150 and 154 to close the corresponding branches of the pipe 15 and connect the cylinder 13 and casing 27 with the atmosphere through the respective ports 153 and 157. When the rod 106 is moved by air pressure against the piston 114 or by the attraction of the core 107 into the solenoid 108, this closes the valve or device 99 and also turns the valves 150 and 154 so that the ports 153 and 157 are closed and communication is had through the branches of the pipe 15 with the cylinder 13 and casing 27.

*Operation.*

Clear conditions: With the valve 87 in clear or normal position, air in the pipe 15 passes to the atmosphere by way of the passages 93 and 92 and port 91. This permits the air to pass from the cylinder 125, and the valves 150 and 154 connect the cylinder 13 and casing 27 with the ports 153 and 157, respectively, so that air can escape from said cylinder and casing. The spring 14 moves the piston 12 to open the valve 10 so that the engineer can supply air from the main reservoir through the valve 2 into the brake pipe 3. The springs 22 move the pistons 20 so that the valves 16 and 17 open the passages through the pipes 4 to the triple valves 5 of the engine and tender. The spring 126 moves the piston 124 to close the valve 120, thereby preventing the discharges of air from the brake pipe 3 even though the speed controlled valve 128 is open. The circuits of the solenoids 52, 69 and 86 are broken at the switch 135 which is normally open, and the circuit of the solenoid 108 is preferably controlled by the arm 122 or a separate switch, so as to open said circuit under clear or normal conditions to prevent the solenoid 108 being energized under such conditions. The pipes indicated by heavy lines in the drawing are normally under brake pipe pressure which enters the cylinder 130 to open the switch 135 and which also enters the casing 27 to close the valve 29 and open the valve 30. Air also flows from the brake pipe 3 through the pipes 4 and 44 into the triple valves 5 and auxiliary reservoirs 7, and the air brakes of the locomotive and cars are therefore under the control of the brake valve 2 as usual for applying and releasing the brakes manually. The pipes 9 are open inasmuch as the pistons 37 are raised by the springs 38, the pipe 41 being connected by the passage 46 and port 47 with the atmosphere. Pressure fluid also flows through the branch pipe 53 into the casing 54 above and below the piston 57, and from above said casing into the reservoir 63.

With the apparatus under clear or normal conditions, the locomotive and car brakes are under the control of the brake valve 2 the same as usual.

Danger or emergency conditions: When the brake valve 2 is manually operated to open the brake pipe 3 to the atmosphere, or when the valve 87 is moved so that the passage 94 connects the pipe 90 with the port 95, in the danger position of the valve 87, the air can discharge from the brake pipe 3 for the emergency or danger application of the brakes to bring the train to a quick stop. This emergency application of the brakes is not interfered with by the present apparatus, either when obtained by the valve 2 or the valve 87, inasmuch as the air has a direct path of escape into the atmosphere through the valve 2 or 87. The air escaping from the casing 27 above the piston 32 through the pipe 33 will also cause the spring 33' to raise the piston 32, thereby closing the valve 30 and opening the valve 29, so that the cylinders 21 are opened into the atmosphere by way of the pipe 28, casing 27 and ports 31, thereby preventing the valves 16 and 17 from closing the pipes 4. This assures of the air also escaping from the locomotive triple valves, in order that the locomotive brakes will be applied under emergency or danger conditions. The valve device 26 therefore renders the valves 16 and 17 inoperative under danger or emergency conditions, that is, for purpose of closing communication between the brake pipe 3 and triple valve 5 as obtained under caution conditions.

Caution or service brake application conditions: When the valve 87 is moved to caution or intermediate position, so that the passage 92 establishes communication between the main reservoir pipe 1 and the pipe 15 this will result in the automatic control of the locomotive and car brakes by the present apparatus through a series of successive steps. The air entering the pipe 15 flows into the cylinder 125 and raises the piston 124 and closes the arm or switch 122 against the contact 145 and opens the valve 120. The air can therefore escape from the brake pipe 3 to the atmosphere by way of the pipe 90, valve 120, pipe 119, casing 127, pipe 118 and cylinder 115, the valve 128 being open when traveling above the maximum caution speed. The air flowing into the cylinder 115 will move the piston 114, thereby swinging the lever 102 to close the valve or device 99 so as to shut off the power, and when the piston 114 has moved past the port of the whistle 117, the air discharges through the whistle to the atmosphere, thereby bleeding the air from the brake pipe 3 and also giving an audible alarm. The rod 106 being moved with the piston 114 will turn the valves 150 and 154 to close the ports 153 and 157 and to establish communication between the pipe 15 and the cylinder 13 and casing 27. The piston 12 is therefore raised to close the valve 10 and shut off the main reservoir from the brake valve 2, to prevent the engineer from releasing the brakes under these conditions, as long as the rod 106 is in its displaced position. Also, air flowing from the pipe 15 past the valve 30 and through the pipes 28 into the cylinders 21 will move the pistons 20 and valves 16 and 17 to close the pipes 4, thereby shutting off the triple valves 5 and locomotive brake pipe 44 from the train line brake pipe 3. The passage or port 23 now establishes communication between the pipes 24 and 25, whereby main reservoir air flows from the pipe 15 into the locomotive brake pipe 44 by way of the passage 79, pipe 25, passage 23, pipe 24, passage 45, and pipe 44, so that the main reservoir pressure is supplied to the triple valves 5 to release the locomotive brakes. The triple valves 5 of the locomotive being shut off from the brake pipe 3, and the locomotive brake pipe 44 being supplied with air from the main reservoir, will result in the locomotive brakes being released while the air is discharging from the brake pipe 3, so that only the brakes of the cars are applied under initial service conditions. Consequently, the momentum of the locomotive will have a tendency to pull the front cars to keep the cars from bunching too rapidly, and thereby preventing the train from buckling. The power being shut off will prevent too great a strain on the draft coupler between the tender and first car. When the arm 122 is moved to open the valve 120, said arm or switch also closes the circuit of the solenoid 108 and generator 109, so that if the vehicle is travelling above a predetermined speed the core 107 is attracted into the solenoid 108 to assist the air pressure against the piston 114 in shutting off the power. Also, when the speed is reduced to close the valve 128 and thereby check the discharge of air from the brake pipe 3, the core 107 is held in the solenoid 108 until the speed is reduced below that speed for which the nut or collar 113 is adjusted. Thus, the power is shut off above a predetermined speed depending upon the adjustment of the nut or collar 113, and if the train is travelling below the maximum caution speed when the valve 87 opens the connection between the pipes 1 and 15, then the valve 128 being closed will prevent the air escaping from the brake pipe 3 even though the valve 120 is opened, so that no brake application is made either on the locomotive or on the cars. Also, the switch 135 and contacts 143—144 being open will prevent the corresponding electrical circuits being closed under caution conditions when travelling below the maximum caution speed.

The second step occurs when the speed has been reduced so that the valve 128 is closed and the contacts 143 and 144 touch one another. A reduction of three pounds or more in the brake pipe 3 will also close the switch 135 by the movement of the piston 131 by the spring 132 against the reduced brake pipe pressure, the screw 133 being adjusted for a pressure of sixty five pounds or thereabout. The closing of the switch 135 will energize the solenoid 86, the circuit including the battery 137, conductor 138, contact 136, switch 135, conductor 140, solenoid 86 and conductor 139. The solenoid 86 is therefore energized and remains energized as long as the pressure in the brake pipe 3 is reduced. The arm or switch 122 engaging the contact 145 and the contacts 143 and 144 touching will also close the circuit of the solenoids 52 and 69. Such circuit includes the battery 137, conductor 138, contact 136, switch 135, conductor 140, contact 145, arm 122, ground, contacts 144 and 143, conductor 142, solenoid 52, conductor 141, switch 75 and contacts 76, solenoid 69 and conductor 139. This circuit requires the pressure in the brake pipe 3 to be reduced for the closing of the switch 135, requires the valve 120 to be opened, and also requires the speed of the train to be reduced so that the contacts 143 and 144 touch, before the solenoids 52 and 69 are energized.

Therefore, after the speed has been reduced so that the valve 128 is closed, with the brakes of the cars being applied, while the brakes of the locomotive are released, the next actions occur. The solenoid 52 being energized will attract the core 51 and shift the valve 42 so as to close communication between the pipes 24 and 44, thereby shutting off the supply of main reservoir pressure through the pipe 15 to the locomotive brake pipe 44. This prevents the release of the locomotive brakes while the solenoid 52 is energized. Also, the pipe 41 instead of being connected with the discharge port 47, is now connected by the passage or port 48 with the pipe 15, so that air flows from the pipe 15 into the pipe 41, forcing the pistons 47 down to close the valves 36, the reservoir 40 being filled with air so as to retard the movement of the pistons 37. The valves 36 being closed will close the pipes 9 so that air from the triple valves 5 cannot escape through said pipes as usual. This closes the normal air discharge passages of the locomotive triple valves, which will prevent the release of the locomotive brakes by the discharge of air through the pipes 9.

At the same time that the valve 42 is moved by the solenoid 52, the valve 59 is moved by the solenoid 69, thereby disconnecting the port 61 from the pipe 53 and connecting said port 61 with the pipe 65 by way of the passage or port 64. Now, the air above the piston 57 can escape through the port 61 and passage 64 into the pipe 65 and expansion reservoir 66, thereby reducing the pressure of air above the piston 57 while the piston 57 is subjected to brake pipe pressure underneath. This difference in pressures will raise the piston 57 and open the valve 56, so that air can now escape from the locomotive brake pipe 44 through the pipe 53 and port 55 to the atmosphere. Consequently, after the brakes of the cars are applied, and the speed is reduced below a predetermined amount, the locomotive brakes are applied partially. The amount of reduction depends on the relative sizes of the reservoirs 63 and 66 and the pressure of the spring 58, inasmuch as a predetermined reduction in pressure in the locomotive brake pipe 44, will result in the pressures above and below the piston 57 being balanced or equalized so that the spring 58 will force the piston 57 down and close the valve 56. This provides for only a partial application of the locomotive brakes, in order to prevent the cars from bunching and buckling the train.

The air from the pipe 65 and reservoir 66 flows into the casing or cylinder 78 and moves the valve 77 against the pressure of the spring 82, the movement of said valve being retarded by the dash pot 84 so as to require approximately thirty seconds. The valve 77 being moved will disconnect the pipes 15 and 25, and the passage 81 will now connect the brake pipe 3 and pipe 15. Air from the pipe 15 immediately flows through the passage 81 into the brake pipe 3, thereby recharging the main brake pipe or train line to release the brakes on the cars, following a partial application of the locomotive brakes. The core 85 being moved into the solenoid 86 will result in the valve 77 being held in its abnormal position against the pressure of the spring 82 even though the air from the pipe 65 is discharged to the atmosphere. Such valve 77 is held by the solenoid 86 until the pressure in the brake pipe 3 is increased up to or nearly normal, so that the piston 131 is moved against the spring 132 to open the switch 135 and break the circuit of the solenoid 86 so that the spring 82 will return the valve 77.

In the meantime, the reduction of pressure in the locomotive brake pipe 44 about fifteen pounds, will result in the piston 71 being moved against locomotive brake pipe pressure by the spring 72, thereby opening the switch 75 and deenergizing the solenoids 52 and 69. As soon as said solenoids are deenergized the valve 42 is returned by the spring 50, thereby connecting the pipe 41 by way of the passage 46 and port 47 with the atmosphere, so that the air above the pistons 37 is discharged and the valves 36 opened by the springs 38. This will permit the locomotive brakes to be released by the discharge of air through the pipes 9. Also, the valve 59 is moved by the spring 70 to normal position so that air from the locomotive brake pipe 44 and pipe 53 will flow through the passage 60 and port 61 above the piston 57, which, assisted by the spring 58, will overcome brake pipe pressure below the piston 57, thereby moving the piston 57 downwardly and closing the valve 56.

Then, with the valves 59 and 42 restored by their springs, and the valve 77 also restored by its spring 82 after the switch 135 has been opened due to the recharging of the brake pipe 3, communication between the pipe 15 and locomotive brake pipe 44 is reestablished by way of the passage 79, pipe 25, passage 23, pipes 24, passage 45 and pipe 44. Therefore, after the brakes of the cars are released, main reservoir air is supplied to the locomotive brake pipe so as to then release the locomotive brakes. The train can then proceed below the maximum caution speed, which, if exceeded, will result in the same application of the brakes as hereinbefore described. When the speed of the train has been reduced by the successive application of the car and locomotive brakes, as aforesaid, the valve 128 is closed first, after which a further reduction in speed results in the rod 106 being returned to initial position by the spring 111 which overcomes the magnetic attraction between the bore 107 and solenoid 108. Consequently, the valve or device 99 is opened to supply the power, and when the rod 106 is returned, the valves 150 and 154 are turned to shut off the cylinder 13 and casing 27 from the air pressure in the pipe 15 and to connect said cylinder and casing with the ports 153 and 157, respectively. The spring 14 will therefore move the piston 12 down so as to open the valve 10, and air can escape from the cylinders 21 through the valve 154 and port 157, whereby the springs 21 return the pistons 20 and valves 16 and 17. The engineer now has command of the power and the brakes of both the locomotive and cars, providing the speed of the train is held down below the maximum caution speed. However, if such speed is exceeded the brakes will be applied and the power shut off the same as hereinbefore described. The reopening of the valve 10 and reopening of the pipes 4, below the predetermined speed, will permit the engineer, by control of the brake valve 2, to release and apply the brakes of the locomotive and cars as usual, and stops can also be made without locking the train against further movement, inasmuch as the brakes can be released and the power applied providing the predetermined speed is not exceeded.

Having thus described the invention, what is claimed as new is:—

1. In an air brake apparatus, a main reservoir pipe, a train line brake pipe, a locomotive brake pipe normally connected to the train line brake pipe, means operable for initiating caution or service brake application conditions, means operable under such conditions for shutting off communication between the brake pipes, means operable under such conditions for opening the train line brake pipe for the discharge of air therefrom and operable to shut off such discharge below a predetermined train speed, and means operable under said conditions for establishing communication between the main reservoir and locomotive brake pipes.

2. An air brake apparatus according to claim 1 including means operable after the train speed has been reduced below said predetermined train speed to open the locomotive brake pipe for the discharge of air therefrom.

3. An air brake apparatus according to claim 1, and including means operable below said predetermined train speed to open the locomotive brake pipe for the discharge of air therefrom until a predetermined reduction in locomotive brake pipe pressure is obtained.

4. An air brake apparatus according to claim 1 and including means operable below said predetermined train speed to open the locomotive brake pipe for the discharge of air therefrom, and means controlling the fourthnamed means to shut off communication between the main reservoir and locomotive brake pipes below a predetermined train speed.

5. In an air brake apparatus, a train line brake pipe, a locomotive brake pipe normally connected thereto, means operable for initiating caution or service brake application conditions, means operable under such conditions for shutting off communication between the brake pipes, means operable under such conditions for opening the train line brake pipe for the discharge of air and operable to shut off such discharge below a predetermined train speed, and means operable below a predetermined train speed to open the locomotive brake pipe for the discharge of air therefrom.

6. In an air brake apparatus, a main reservoir pipe, a train line brake pipe, a locomotive brake pipe normally connected to the train line brake pipe, means operable for initiating caution or service brake application conditions, means operable under such conditions for shutting off communication between the brake pipes, means operable under such conditions for opening the train line brake pipe for the discharge of air and operable to shut off such discharge below a predetermined train speed, means operable under such conditions for establishing communication between the main reservoir and locomotive brake pipes, means operable below a predetermined train speed for opening the locomotive brake pipe for the limited discharge of air therefrom, and means operable following the operation of the fifthnamed means for connecting the main reservoir and train line brake pipes to recharge the train line brake pipe.

7. In an air brake apparatus, a train line brake pipe, a locomotive brake pipe, means operable for initiating caution or service brake application conditions, means operable under such conditions for opening the train line brake pipe for the discharge of air therefrom and operable to shut off such discharge below a predetermined train speed, and means operable below a predetermined train speed to open the locomotive brake pipe for the discharge of air therefrom.

8. In an air brake apparatus, a train line brake pipe, a locomotive brake pipe, means operable for initiating caution or service brake application conditions, means operable under such conditions for opening the train line brake pipe for the discharge of air and operable to shut off such discharge below a predetermined train speed, means operable below a predetermined train speed to open the locomotive brake pipe for the limited discharge of air therefrom, and means operable following the operation of the thirdnamed means for recharging the train line brake pipe.

9. In an air brake apparatus, a main reservoir pipe, a train line brake pipe, a locomotive brake pipe normally connected to the train line brake pipe, means operable for initiating caution or service brake application conditions, means operable under such conditions for shutting off communication between the brake pipes, means operable under such conditions for opening the train line brake pipe for the discharge of air and operable to shut off such discharge below a predetermined train speed, means operable under such conditions for establishing communication between the main reservoir and locomotive brake pipes, means operable below a predetermined train speed for opening the locomotive brake pipe for the limited discharge of air therefrom, and means operable following the operation of the fifthnamed means to disconnect the locomotive brake pipe from the main reservoir pipe and to connect the main reservoir and train line brake pipes to recharge the train line brake pipe and operable to disconnect the main reservoir and train line brake pipes when the train line brake pipe has been recharged.

10. In an air brake apparatus, a main reservoir pipe, a train line brake pipe, a locomotive brake pipe normally connected to the train line brake pipe, means operable for initiating caution or service brake application conditions, means operable under such conditions for shutting off communication between the brake pipes, means operable under such conditions for opening the train line brake pipe for the discharge of air and operable to shut off such discharge below a predetermined train speed, means operable under such conditions for establishing communication between the main reservoir and locomotive brake pipes, means operable below a predetermined train speed for opening the locomotive brake pipe for the limited discharge of air therefrom, means operable with the fifthnamed means for disconnecting the main reservoir and locomotive brake pipes while air is discharged from the locomotive brake pipe, and means operable following the operation of the fifth and sixthnamed means for disconnecting the main reservoir and locomotive brake pipes and connecting the main reservoir and train line brake pipes to recharge the train line brake pipe and operable after the train line brake pipe is recharged to disconnect the main reservoir and train line brake pipes and reestablish communication between the main reservoir and locomotive brake pipes.

11. In an air brake apparatus, a train line brake pipe, a locomotive brake pipe, means operable for initiating caution or service brake application conditions, means operable under such conditions for opening the train line brake pipe for the discharge of air and operable to shut off such discharge below a predtermined train speed, means operable below a predetermined train speed to open the locomotive brake pipe for the discharge of air therefrom, and means operable following the operation of the thirdnamed means for recharging the train line brake pipe and then recharging the locomotive brake pipe.

12. In an air brake apparatus, a brake pipe, a triple valve connected thereto, means for opening the brake pipe for the discharge of air until the pressure has been reduced to a predetermined amount, and means operable with the aforesaid means for closing the discharge passage of said triple valve during the discharge of air from the brake pipe.

13. In an air brake apparatus, a train line brake pipe, a locomotive brake pipe normally connected thereto, means operable for initiating caution or service brake application conditions, means operable under such conditions for shutting off communication between the brake pipes, and means operable under an emergency reduction in pressure in the train line brake pipe to prevent the operation of the secondnamed means.

14. In an air brake apparatus, a train line brake pipe, a locomotive brake pipe normally connected thereto, means operable for initiating caution or service brake application conditions, air operated means operable under such conditions for shutting off a communication between the brake pipes, and means operated by air pressure from the train line brake pipe to prevent the operation of the secondnamed means when an emergency reduction in pressure is made in the train line brake pipe.

15. In an air brake apparatus, a train line brake pipe, a locomotive brake pipe normally connected thereto, a third pipe, means operable for admitting air into the third pipe under caution or service brake application conditions, means receiving air from the third pipe for shutting off communication between the brake pipes, and a valve device controlled by air pressure in the train line brake pipe for disconnecting the second named means from the third pipe and connecting the secondnamed means with the atmosphere when there is an emergency reduction in pressure in the train line brake pipe.

16. In an air brake apparatus, a train line brake pipe, a locomotive brake pipe, means operable for initiating caution or service brake application conditions, means operable under such conditions for opening the train line brake pipe for the discharge of air and operable to shut off such discharge below a predetermined train speed, means operable below a predetermined train speed to open the locomotive brake pipe for the discharge of air therefrom, and means operable following the operation of the third named means for recharging the train line brake pipe and controlled by train line brake pipe pressure for recharging the locomotive brake pipe after the train line brake pipe has been recharged.

17. In an air brake apparatus, a train line brake pipe, a locomotive brake pipe normally connected to the train line brake pipe, a third pipe, means operable for admitting air under pressure into said third pipe, means operated by air from said third pipe for shutting off communication between the brake pipes, means operated by air from said third pipe for opening the train line brake pipe for the discharge of air therefrom, speed controlled means for shutting off such discharge below a predetermined train speed, and means operated by air from said third pipe for establishing communication between the third pipe and locomotive brake pipe.

18. An air brake apparatus according to claim 17 including means operable after the train speed has been reduced below said predetermined train speed to open the locomotive brake pipe for the discharge of air therefrom.

19. An air brake apparatus according to claim 17 including means operable below said predetermined train speed to open the locomotive brake pipe for the discharge of air therefrom, and means controlling the fifthnamed means to shut off communication between the third and locomotive brake pipes below a predetermined train speed.

20. In an air brake apparatus, a train line brake pipe, a locomotive brake pipe normally connected thereto, means operable for initiating caution or service brake application conditions, a third pipe arranged to receive air under pressure when said means is operated to produce such conditions, means operated by air from said third pipe for shutting off communication between the brake pipes, means operated by air from said third pipe for opening the train line brake pipe for the discharge of air, speed controlled means for shutting off such discharge of air below a predetermined train speed, and means operable below a predetermined train speed to open the locomotive brake pipe for the discharge of air therefrom.

21. In an air brake apparatus, a train line brake pipe, a locomotive brake pipe normally connected to the train line brake pipe, means operable for initiating caution or service brake application conditions, a third pipe for receiving air under pressure under such conditions, means operated by air from said third pipe for shutting off communication between the brake pipes, means operated by air from said third pipe for opening the train line brake pipe for the discharge of air, speed control means for shutting off such discharge below a predetermined train speed, means operated by air from said third pipe for establishing communication between the third and locomotive brake pipes, means operable below a predetermined train speed for opening the locomotive brake pipe for the limited discharge of air therefrom, and means operable following the operation of the sixth-named means for connecting the third and train line brake pipes to recharge the train line brake pipe.

22. In an air brake apparatus, a train line brake pipe, a locomotive brake pipe, means operable for initiating caution or service brake application conditions, a third pipe arranged to receive air under pressure when said means is operated, means operated by air from said third pipe for opening the train line brake pipe for the discharge of air therefrom, speed control means for shutting off such discharge below a predetermined train speed, and means operable below a predetermined train speed to open the locomotive brake pipe for the discharge of air therefrom.

23. In an air brake apparatus, a train line brake pipe, a locomotive brake pipe, means operable for initiating caution or service brake application conditions, a third pipe arranged to receive air under pressure when said means is operated, means operated by air in said third pipe for opening the train line brake pipe for the discharge of air, speed control means for shutting off such discharge below a predetermined train speed, means operable below a predetermined train speed to open the locomotive brake pipe for the limited discharge of air therefrom, and means operable following the operation of the third-named means for recharging the train line brake pipe from said third pipe.

24. In an air brake apparatus, a train line brake pipe, a locomotive brake pipe normally connected to the train line brake pipe, means operable for initiating caution or service brake application conditions, a third pipe arranged to receive air under pressure when said means is operated, means operated by air in said third pipe for shutting off communication between the brake pipes, means operated by air in said third pipe for opening the train line brake pipe for the discharge of air, speed control means for shutting off such discharge below a predetermined train speed, means operated by air in said third pipe for establishing communication between the third and locomotive brake pipes, means operable below a predetermined train speed for opening the locomotive brake pipe for the limited discharge of air therefrom, and means operable following the operation of the sixth-named means to disconnect the third and locomotive brake pipes, and connect the third and train line brake pipes to recharge the train line brake pipe and operable to disconnect the third and train line brake pipes when the train line brake pipe has been recharged.

25. In an air brake apparatus, a main reservoir pipe, a train line brake pipe, a locomotive brake pipe normally connected to the train line brake pipe, means operable for initiating caution or service brake application conditions, a fourth pipe receiving air from the main reservoir pipe under such conditions, means operated by air in the fourth pipe for shutting off communication between the brake pipes, means operated by air in the fourth pipe for opening the train line brake pipe for the discharge of air, speed control means for shutting off such discharge below a predetermined train speed, means operated by air in the fourth pipe for establishing communication between the fourth and locomotive brake pipes, means operable below a predetermined train speed for opening the locomotive brake pipe for the limited discharge of air therefrom, means operable with the sixthnamed means for disconnecting the fourth and locomotive brake pipes while air is discharged from the locomotive brake pipe, and means operable following the operation of the sixth and seventhnamed means for disconnecting the fourth and locomotive brake pipes and connecting the fourth and train line brake pipes to recharge the train line brake pipes and operable after the train line brake pipe is recharged to disconnect the fourth and train line brake pipes and reestablish communication between the fourth and locomotive brake pipes.

26. In an air brake apparatus, a train line brake pipe, a locomotive brake pipe, means operable for initiating caution or service brake application conditions, a third pipe arranged to receive air under pressure when said means is operated, means operated by air in said third pipe for opening the train line brake pipe for the discharge of air, speed control means for shutting off such discharge below a predetermined train speed, means operable below a predetermined train speed to open the locomotive brake pipe for the discharge of air therefrom, and means operable following the operation of the thirdnamed means for recharging the train line brake pipe and then recharging the locomotive brake pipe.

27. In an air brake apparatus, a train line brake pipe, a locomotive brake pipe, means operable for initiating caution or service brake application conditions, a third pipe arranged to receive air under pressure when said means is operated, means operated by air in said third pipe for opening the train line brake pipe for the discharge of air, speed control means for shutting off such discharge below a predetermined train speed, means operable below a predetermined train speed to open the locomotive brake pipe for the discharge of air therefrom, and means operable following the operation of the fourthnamed means for recharging the train line brake pipe and controlled by train line brake pressure for recharging the locomotive brake pipe after the train line brake pipe has been recharged.

28. In an air brake apparatus, train line and locomotive brake pipes, means for initiating caution or service brake application conditions, and mechanism operable under such conditions for opening the train line brake pipe for the discharge of air therefrom above a predetermined train speed and for opening the locomotive brake pipe for the discharge of air therefrom below a predetermined train speed.

29. In an air brake apparatus, train line and locomotive brake pipes, means for establishing caution or service brake application conditions, and mechanism operable under such conditions for opening the train line and locomotive brake pipes for the discharge of air therefrom above and below predetermined train speeds, respectively, and for shutting off the discharge from the locomotive brake pipe when a predetermined reduction has been made.

30. In an air brake apparatus, train line and locomotive brake pipes, means for initiating caution or service brake application conditions, and mechanism operable under such conditions for opening the train line and locomotive brake pipes for the discharge of air therefrom above and below predetermined train speeds, respectively, and operable following the reduction in locomotive brake pipe pressure for recharging the train line and locomotive brake pipes in succession.

31. In an air brake apparatus, a brake pipe, a triple valve connected thereto, means operable for initiating caution or service brake application conditions, a pipe supplied with air under pressure under such conditions and connected to said brake pipe, means for opening the brake pipe for the limited discharge of air therefrom, and means operable with the second named means for closing the discharge passage of the triple valve and shutting off communication between said pipes during the discharge of air from the brake pipe.

32. In an air brake apparatus, a brake pipe, a triple valve connected thereto, means for initiating caution or service brake application conditions, a pipe arranged to receive air under pressure under such conditions and communicating with said brake pipe, means operable for opening the brake pipe for the discharge of air until the pressure has been reduced to a predetermined amount, air pressure operated means for closing the discharge passage of the triple valve and operated by air from the secondnamed pipe, and means operable simultaneously with the secondnamed means for connecting the thirdnamed means with the secondnamed pipe and disconnecting said pipes when the secondnamed means is operable to discharge air from the brake pipe.

33. In an air brake apparatus, a brake pipe, a normally closed valve controlling the discharge outlet of said brake pipe, means normally connected to the brake pipe and subjected to brake pipe air pressure at opposite sides, said means controlling said valve to hold it normally closed and being in communication at one side with said discharge outlet when the valve is open, a reservoir communicating with the opposite side of said means, an expansion reservoir, a valve movable to a position to shut off communication between the secondnamed side of said means and the brake pipe and to establish communication between said reservoirs and the secondnamed side of said means, and means controlling the lastnamed valve to move it to said position and to restore it when the pressure at the firstnamed side of the firstnamed means is reduced to a predetermined amount.

34. In an air brake apparatus, a brake pipe, a normally closed valve controlling the discharge outlet of said brake pipe, means normally connected to the brake pipe and subjected to brake pipe air pressure at opposite sides, said means controlling said valve to hold it normally closed and being in communication at one side with said discharge outlet when the valve is open, a reservoir communicating with the opposite side of said means, an expansion reservoir, a valve movable to a position to shut off communication between the secondnamed side of said means and the brake pipe and to establish communication between said reservoir and the secondnamed side of said means, electric means included in an electric circuit for moving the lastnamed valve to said position when the circuit is closed, and means controlled by air pressure at the firstnamed side of the firstnamed means to open said circuit for the return of the lastnamed valve when the pressure at the firstnamed side of said firstnamed means is reduced to a predetermined amount.

35. In an air brake apparatus, a train line brake pipe, a locomotive brake pipe, means for establishing caution or service brake application conditions, a third pipe supplied with air under pressure and communicating with the locomotive brake pipe under said conditions, means operable under said conditions for opening the train line brake pipe for the discharge of air and for shutting off such discharge below a predetermined train speed, means operable below a predetermined train speed to open the locomotive brake pipe for the discharge of air and for closing communication between the third and locomotive brake pipes until a predetermined reduction in locomotive brake pipe air pressure is obtained, said thirdnamed means including a reservoir normally communicating with the locomotive brake pipe and an expansion reservoir arranged to receive air from the firstnamed reservoir when the thirdnamed means is operable, and means operated by air from said expansion reservoir for shutting off communication between the third and locomotive brake pipes and establishing communication between the third and train-line brake pipes to recharge the train line brake pipe.

36. An air brake apparatus according to claim 35, and including means controlled by air pressure in the train line brake pipe and operable for holding the fourthnamed means when operated and releasing same for return movement, when the train line brake pipe has been recharged, to reestablish communication between the third and locomotive brake pipes.

37. In an air brake apparatus, a train line brake pipe, a locomotive brake pipe, means for establishing caution or service brake application conditions, a third pipe supplied with air under pressure and communicating with the locomotive brake pipe under said conditions, means operable under said conditions for opening the train line brake pipe for the discharge of air and for shutting off such discharge below a predetermined train speed, means operable below a predetermined train speed to open the locomotive brake pipe for the discharge of air and for closing communication between the third and locomotive brake pipes until a predetermined reduction in locomotive brake pipe air pressure is obtained, said thirdnamed means including a reservoir normally communicating with the locomotive brake pipe and an expansion reservoir arranged to receive air from the firstnamed reservoir when the thirdnamed means is operable, means operated by air from said expansion reservoir for shutting off communication between the third and locomotive brake pipes and establishing communication between the third and train line brake pipes to recharge the train line brake pipe and also operable thereafter to discharge the air from the expansion reservoir, and means controlled by air pressure in the train line brake pipe for holding the fourth-named means in operated position as long as the train line brake pipe air pressure is below a predetermined amount.

38. In an automatic train control apparatus, a brake pipe, means for initiating caution or service brake application conditions, means operable under said conditions for opening the brake pipe for the discharge of air, speed control means for shutting off such discharge below a predetermined train speed, power interrupting means for shutting off the propulsion power of the train, and means for operating the power interrupting means by the aforesaid discharge of air.

39. In an automatic train control apparatus, a brake pipe, means for initiating caution or service brake application conditions, means operable under said conditions for opening the brake pipe for the discharge of air, speed control means for shutting off such discharge below a predetermined train speed, power interrupting means for shutting off the propulsion power of the train, and means operable under said conditions and controlled by train speed to operate the power interrupting means above a predetermined train speed.

40. In an automatic train control apparatus, a brake pipe, means for initiating caution or service brake application conditions, means operable under said conditions for opening the brake pipe for the discharge of air, speed control means for shutting off such discharge below a predetermined train speed, power interrupting means for shutting off the propulsion power of the train, means for operating the power interrupting means by the aforesaid discharge of air, and other means operable under said conditions and controlled by train speed to also operate the power interrupting means above a predetermined train speed.

41. In an automatic train control apparatus, a brake pipe, speed control means, controlling means for said brake pipe movable to clear, caution and danger positions and adapted to open the brake pipe to atmosphere through the speed control means when in caution position and to open the brake pipe direct to the atmosphere when in danger position, power interrupting means for shutting off the propulsion power of the train, means for operating the power interrupting means when the secondnamed means is in caution position, and an operative connection between said controlling and power interrupting means for operating the power interrupting means when the controlling means is moved to danger position.

42. In an air brake apparatus, train line and locomotive brake pipes, means for initiating caution or service brake application conditions, and mechanism operable under such conditions for opening the train line and locomotive brake pipes in succession and then recharging them in succession.

43. In an air brake apparatus, train line and locomotive brake pipes, means for initiating caution or service brake application conditions, and mechanism operable under such conditions for opening the train line and locomotive brake pipes in succession.

44. In an air brake apparatus, train line and locomotive brake pipes, means for initiating caution or service brake application conditions, and mechanism operable under such conditions for opening the train line and locomotive brake pipes in succession dependent on the speed of the train.

45. In an air brake apparatus, train line and locomotive brake pipes, means for initiating caution or service brake application conditions, and mechanism operable under such conditions for opening the train line and locomotive brake pipes in succession dependent on the speed of the train and for recharging the train line and locomotive brake pipes following reduction in locomotive brake pipe pressure.

In testimony whereof I hereunto affix my signature.

DANIEL HERBERT SCHWEYER.